Oct. 18, 1932.  L. H. WHEELER  1,883,201

LUBRICANT COMPRESSOR

Filed Jan. 31, 1929

Inventor
Leonard H Wheeler
By Williams, Bradbury, McCaleb & Hinkle
Attys.

Patented Oct. 18, 1932

1,883,201

UNITED STATES PATENT OFFICE

LEONARD H. WHEELER, OF CHICAGO, ILLINOIS, ASSIGNOR TO ALEMITE CORPORATION, OF CHICAGO, ILLINOIS, A CORPORATION OF DELAWARE

LUBRICANT COMPRESSOR

Application filed January 31, 1929. Serial No. 336,408.

My invention relates generally to lubricant compressors, frequently called "grease guns", which are used to force lubricant under high pressure into fittings attached to bearings to be lubricated. More particularly my invention relates to improvements in high pressure grease guns of the type in which the connection with the fitting and the compression of the lubricant are accomplished by a single longitudinal movement of the compressor handle toward the lubricant receiving fitting.

It is an object of my invention to provide an improved grease gun of the above-mentioned type which has a high pressure cylinder and plunger and a simple and effective means for priming the high pressure cylinder.

A further object is to provide a simple grease gun which is easily operated, which is simple in construction, and which may be economically manufactured.

Figure 1:
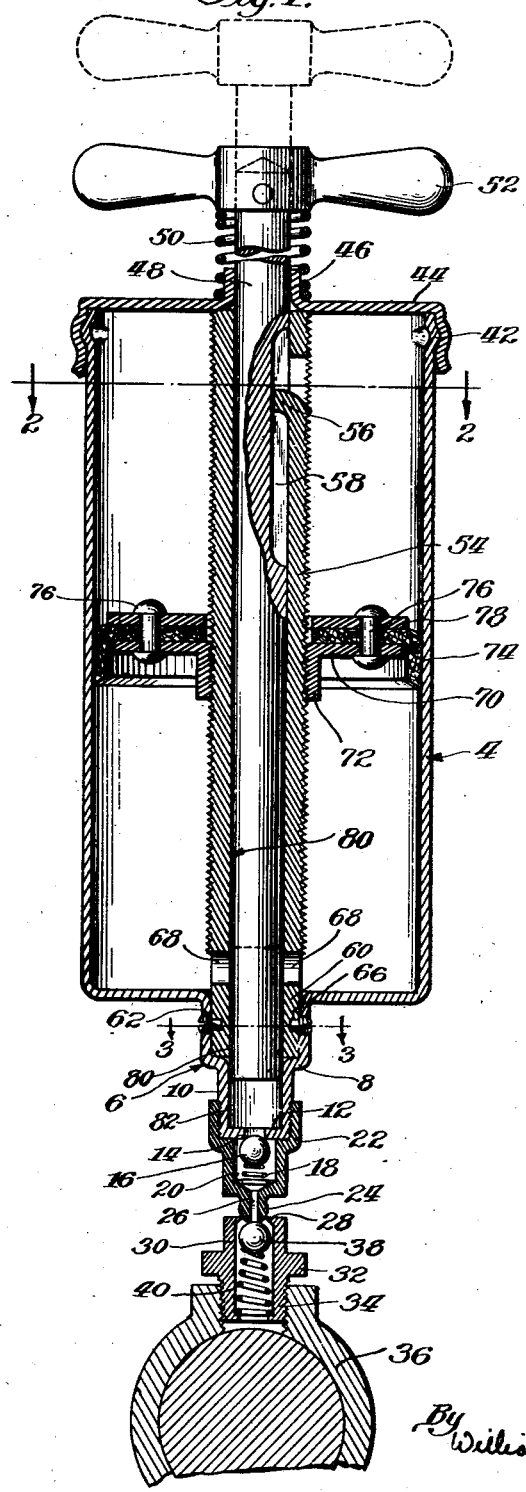
Figure 2:
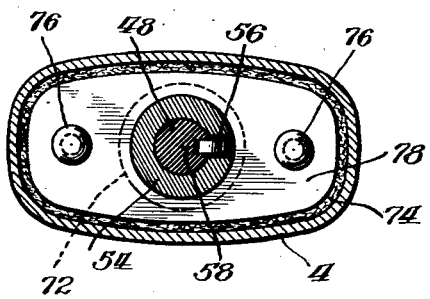
Figure 3:
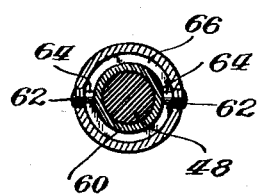

Other objects and advantages will appear from the following description, reference being had to the accompanying drawing, in which Fig. 1 is a central longitudinal section of the grease gun and lubricant receiving fitting;

Fig. 2 is a transverse sectional view thereof taken on the line 2—2 of Fig. 1; and Fig. 3 is a similar view taken on the line 3—3 of Fig. 1.

The grease gun comprises a barrel 4 which is substantially elliptical in cross section as shown in Fig. 2. The lower end of the barrel has a cylindrical wall 6 which is joined by a shoulder 8 with the lower end 10 of a high pressure cylinder. The bottom of the cylinder 10 has an inwardly built flange 12 which forms a seat 14 for a ball check-valve 16 held against the seat by a spring 18. The spring is confined within a bore 20 in a nozzle 22 which is threaded over the end of the cylinder 10.

The nozzle has a substantially spherical tip 24 which has a discharge duct 26 drilled therethrough and leading into the bore 20. The spherical tip 24 is adapted to seal against a sharp edge 28 surrounding an opening in the end of a substantially tubular fitting 30. The fitting has a hexagonal portion 32 and a threaded portion 34 by which it may be secured to a bearing 36. The opening at 28 is normally closed by a ball check-valve 38 held against the inner surface of the edge 28 by a spring 40.

The upper end of the barrel 4 has outwardly extending ribs 42 which cooperate with complemental grooves formed in the peripheral flanges of a cap 44 to hold the latter upon the end of the barrel. The cap 44 has a central upwardly built annular flange 46 which serves as a guide for a plunger 48. A spring 50 is compressed between the cap 44 and a handle 52 rigidly secured at the upper end of plunger 48. The plunger is longitudinally slidable in an externally threaded sleeve 54 but is held against rotation relative thereto by a lug 56 struck inwardly from the sleeve 54, which lies in a longitudinal slot 58 formed in the plunger 48.

The lower end portion 60 of the sleeve 54 is cylindrical in shape and fits snugly within the cylindrical wall 6 but is of course rotatable therein. A pair of set screws 62 have smooth end portions 64 which fit in an annular groove 66 formed in the portion 60 at the sleeve 54. The sleeve 54 has a pair of radial inlet ports 68 adjacent the lower end thereof. A face plate 70 has a flange 72 which is internally threaded to cooperate with the external threads on the sleeve 54. A cup leather 74 is secured to the face plate 70 by rivets 76 which also pass through a backing plate 78. The internal bores 80 and 82 of the portion 60 and cylinder 10, respectively, together form a high pressure cylinder for the lower end of the plunger 48.

In operation, the cap 44 and the cup leather piston are removed and the barrel 4 filled with a lubricant. The cup leather piston is then threaded on the sleeve 54 and the cap 44 snapped in place over the ribs 42. The compressor may then be operated to prime the high pressure cylinder by rotating the handle 52 relative to the barrel. This will cause the cup leather piston to travel downwardly since it is restrained from rotation due to its elliptical shape and since the sleeve 54 is constrained to rotate with the plunger because of the interengagement of lug 56 with the slot 58.

The fact that the high pressure cylinder has been sufficiently primed is apparent when the lubricant is extruded from the tip of the nozzle in a steady stream. After the device has thus been placed in condition for operation, the operator will grasp the handle 52 and apply the nozzle to the lubricant receiving fitting and move the plunger toward the fitting. Upon the initial portion of this movement the plunger will slide in the sleeve from the position in which it is shown in dotted lines in Fig. 1 to a position in which it will completely cut off the ports 68.

Further movement of the plunger will force the lubricant in the bores 80 and 82 which constitute the high pressure cylinder, past the check-valve 14 and into the lubricant receiving fitting 30. At the end of the discharge stroke of the plunger (when its end abuts against the flange 12) the operator will decrease the application of manual force on the handle 52 and permit the spring 50 to force the plunger outwardly until it is again in the position shown in dotted lines in Fig. 1.

Ordinarily the check-valve 16 will seal tightly against its seat 14 so that a vacuum will be formed in the high pressure cylinder until the plunger uncovers the port 68, when the lubricant will be forced into the high pressure cylinder by atmospheric pressure. However, reliance upon atmospheric pressure to prime the high pressure cylinder is unsatisfactory due to the prevalency of air pockets in the grease or other lubricant and due to the fact that the grease is not withdrawn from all portions of the barrel but has a tendency to suck a channel through the main body of the grease, thus rendering the compressor inoperative to reject grease.

At the end of each return stroke or at least after several discharge strokes, the operator will preferably rotate the handle 52 and sleeve 54, thereby to advance the cup leather piston and force the lubricant under pressure into the high pressure cylinder. The priming of the high pressure cylinder is thus assured at all times merely by slightly rotating the handle 52 relative to the barrel. The fact that the barrel is substantially elliptical in cross section makes it possible easily to grasp the barrel and to pack the compressor in a tool-box.

The invention is capable of wide variation within equivalent limits and I contemplate such variation as may be desirable or useful in the particular adaptation of the invention shown, or in its adaptaton to other devices. I do not restrict myself in any unessential particulars, but what I claim and desire to secure by Letters Patent is:

1. A high pressure lubricant compressor comprising a barrel, an externally threaded sleeve forming a high pressure cylinder rotatably mounted therein, a piston threaded on said sleeve and cooperating with the walls of said barrel, a manually operable plunger longitudinally slidable in said sleeve, said plunger having a longitudinal slot therein, a lug projecting inwardly from said sleeve into said slot, inlet ports adjacent the lower end of said sleeve, a discharge nozzle secured at the lower end of said barrel, and a spring tending to move said plunger outwardly relative to said sleeve.

2. A high pressure lubricant compressor comprising a barrel, a piston in said barrel, a piston stem threaded through said piston and rotatably mounted in said barrel, said stem having a cylindrical bore extending longitudinally thereof, a plunger longitudinally slidable in said bore, cooperating means on said plunger and stem for preventing relative rotation thereof, and a high pressure cylinder at the end of said barrel and in axial alignment with the bore of said stem.

3. A high pressure lubricant compressor comprising a barrel of non-circular cross section, an externally threaded sleeve forming a high pressure cylinder rotatably mounted therein, means to prevent longitudinal movement of said sleeve, a piston threaded on said sleeve and cooperating with the walls of said barrel, a plunger longitudinally slidable in said high pressure cylinder, means to prevent relative rotation of said plunger and cylinder, inlet ports in said cylinder adjacent the lower end of said sleeve, a discharge nozzle secured at the lower end of said barrel, and a spring tending to move said plunger outwardly relative to said sleeve.

4. A high pressure lubricant compressor comprising a barrel of non-circular cross section, a sleeve rotatably mounted therein, a piston threaded on said sleeve and cooperating with the walls of said barrel, a plunger longitudinally slidable within said sleeve and having a handle at the outer end thereof, cooperating means on said plunger and sleeve to prevent relative rotation thereof, radial inlet ports adjacent the lower end of said sleeve, a high pressure cylinder in the lower end of said barrel and in axial alignment with said plunger, a discharge nozzle secured at the end of said high pressure cylinder, an outwardly opening check valve in said nozzle, and a spring tending to move said plunger outwardly relative to said sleeve.

5. A high pressure lubricant compressor comprising an elliptically shaped barrel, an exteriorly threaded sleeve forming a high pressure cylinder rotatably mounted therein, lock members in said barrel adapted to slide in an annular groove in said sleeve to prevent longitudinal movement of the sleeve, an elliptically shaped piston threaded on said sleeve and cooperating with the walls of said barrel, a plunger reciprocably mounted in the cylinder formed by said sleeve, means thereon to prevent relative rotary movement between said plunger and said sleeve, inlet ports in said sleeve adjacent the lower end thereof and a discharge nozzle secured to the lower end of said barrel.

6. A high pressure lubricant compressor comprising a barrel of non-circular cross section, a discharge nozzle at the lower end thereof, an externally threaded sleeve forming a high pressure cylinder rotatably mounted in said barrel and having inlet ports at its lower end, a piston threadedly mounted on said sleeve having a cross section similar to the cross section of the barrel and said piston adapted to be advanced without rotation to force lubricant into said discharge nozzle through the lower end of said sleeve.

7. A high pressure hand compressor comprising an elliptically shaped barrel, a valved outlet at one end of said barrel, a high pressure cylinder axially arranged in said barrel and communicating with said valved outlet, said high pressure cylinder being exteriorly screw-threaded and rotatably mounted within said barrel, an elliptically shaped follower in said barrel threaded upon said cylinder, inlet ports in said cylinder adjacent the lower end thereof, and a hand operated plunger reciprocably mounted therein.

8. A high pressure hand compressor comprising an elliptically shaped barrel, a valved outlet at one end of said barrel, a high pressure cylinder axially arranged in said barrel and communicating with said valved outlet, said high pressure cylinder being exteriorly screw-threaded and rotatably mounted within said barrel, an elliptically shaped follower in said barrel threaded upon said cylinder, inlet ports in said cylinder adjacent the lower end thereof, a hand operated plunger reciprocably mounted therein, and cooperating means between said plunger and said cylinder for rotating the same simultaneously.

In witness whereof, I hereunto subscribe my name this 25th day of January, 1929.

LEONARD H. WHEELER.